(12) United States Patent
Tang

(10) Patent No.: US 8,382,214 B2
(45) Date of Patent: Feb. 26, 2013

(54) CASE

(75) Inventor: Zi-Ming Tang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 291 days.

(21) Appl. No.: 12/884,458

(22) Filed: Sep. 17, 2010

(65) Prior Publication Data

US 2011/0156553 A1    Jun. 30, 2011

(30) Foreign Application Priority Data

Dec. 25, 2009  (CN) .......................... 2009 1 0312266

(51) Int. Cl.
    *A47B 81/00*    (2006.01)
(52) U.S. Cl. ................... 312/223.2; 312/263; 312/265.5
(58) Field of Classification Search ............... 312/223.2, 312/263, 265.5; 361/726–727, 679.58
    See application file for complete search history.

(56) References Cited

U.S. PATENT DOCUMENTS

| | | | |
|---|---|---|---|
| 6,669,243 B2 * | 12/2003 | Katoh et al. | 292/34 |
| 6,932,447 B2 * | 8/2005 | Chen et al. | 312/223.2 |
| 7,166,799 B2 * | 1/2007 | Chen et al. | 174/50 |
| 7,184,261 B2 * | 2/2007 | Chung | 361/679.56 |
| 7,208,686 B1 * | 4/2007 | Chen et al. | 174/561 |
| 7,232,193 B2 * | 6/2007 | Cunningham et al. | 312/265.5 |
| 2002/0185944 A1 * | 12/2002 | Chen | 312/223.2 |
| 2005/0040740 A1 * | 2/2005 | Yun | 312/223.2 |
| 2007/0206348 A1 * | 9/2007 | Lin | 361/683 |
| 2008/0225475 A1 * | 9/2008 | Zhang et al. | 361/683 |
| 2008/0239646 A1 * | 10/2008 | Chen et al. | 361/683 |

FOREIGN PATENT DOCUMENTS

CN    2574095 Y    9/2003

\* cited by examiner

*Primary Examiner* — Hanh V Tran
(74) *Attorney, Agent, or Firm* — Altis Law Group, Inc.

(57) ABSTRACT

A case includes a cover, a bezel and a locking member. The cover includes a positioning portion and a plurality of mounting holes. The bezel includes a plurality of engaging portions located on the inner surface of the bezel. The engaging portions pass through the mounting holes. The locking member is slidably attached to the cover. The locking member includes a latching portion engaging with the engaging portion and a resilient portion resisting the positioning portion. The resilient portion is detached from the positioning portion by deformation of the resilient portion.

20 Claims, 6 Drawing Sheets

CASE

BACKGROUND

1. Technical Field

The present disclosure relates to cases, and particularly, to a computer case having a bezel.

2. Description of the Related Art

Case is an important component of an electronic device, such as a computer case, to contain some electronic components of computer. The computer case can protect the electronic components from electric magnetic interference (EMI).

A typical computer case includes a chassis, a cover and a faceplate. The chassis is used to receive a motherboard, a hard disk, a power source and so on. The cover is mounted on a side of the chassis. The bezel is detachably fixed on the cover. The cover includes two extending portions arranged at opposite ends of the cover. Each extending portion defines a plurality of mounting holes aligned in a line. The bezel includes a plurality of positioning protrusions engaging in the mounting holes. The bezel is fixed on the cover by a plurality of threaded members. However, it is inconvenient to assemble and disassemble the bezel from the cover due to the threaded members (not shown).

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
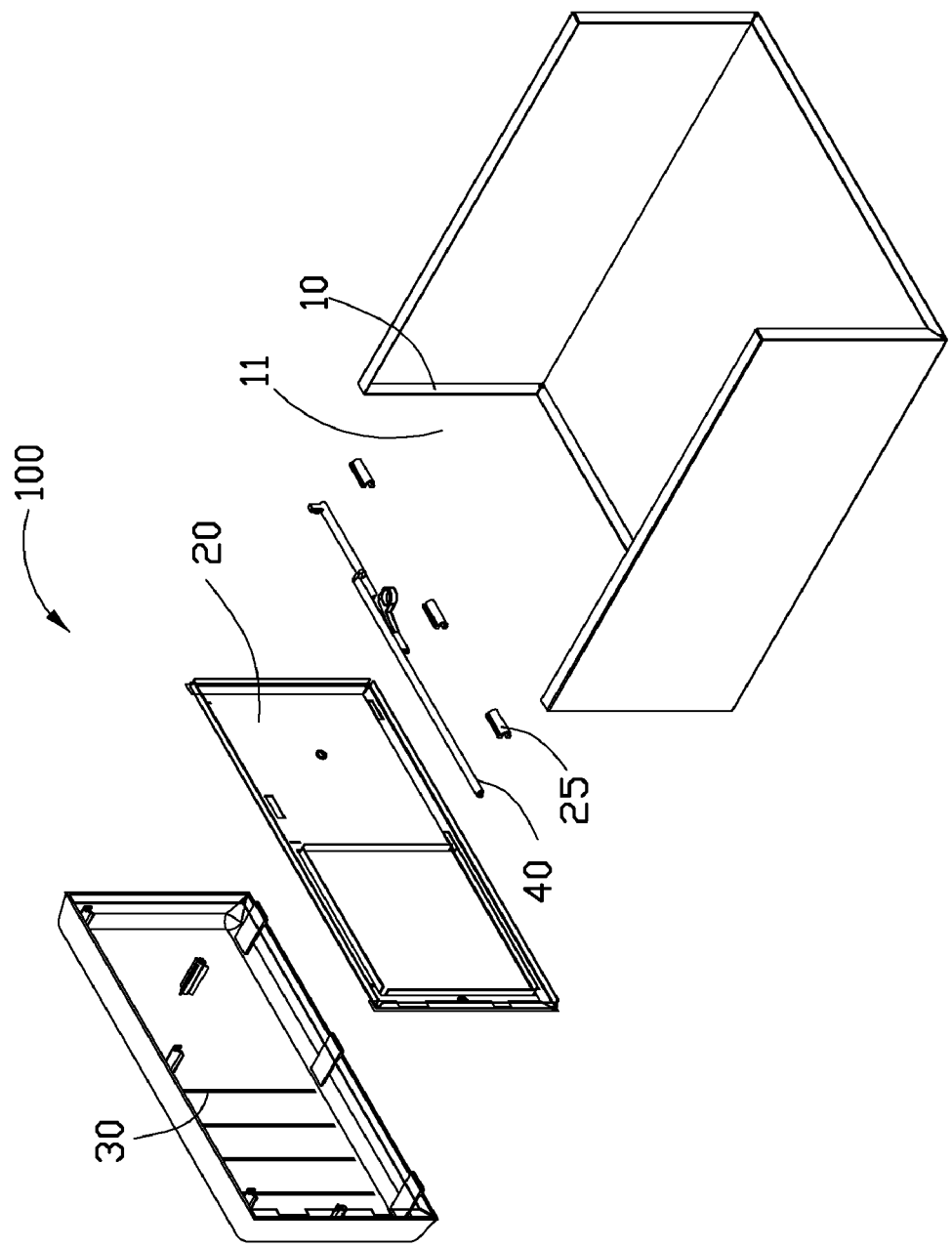
FIG. 1 is an exploded, isometric view of one embodiment of a case including a cover, a bezel and a locking member.
Figure 2:
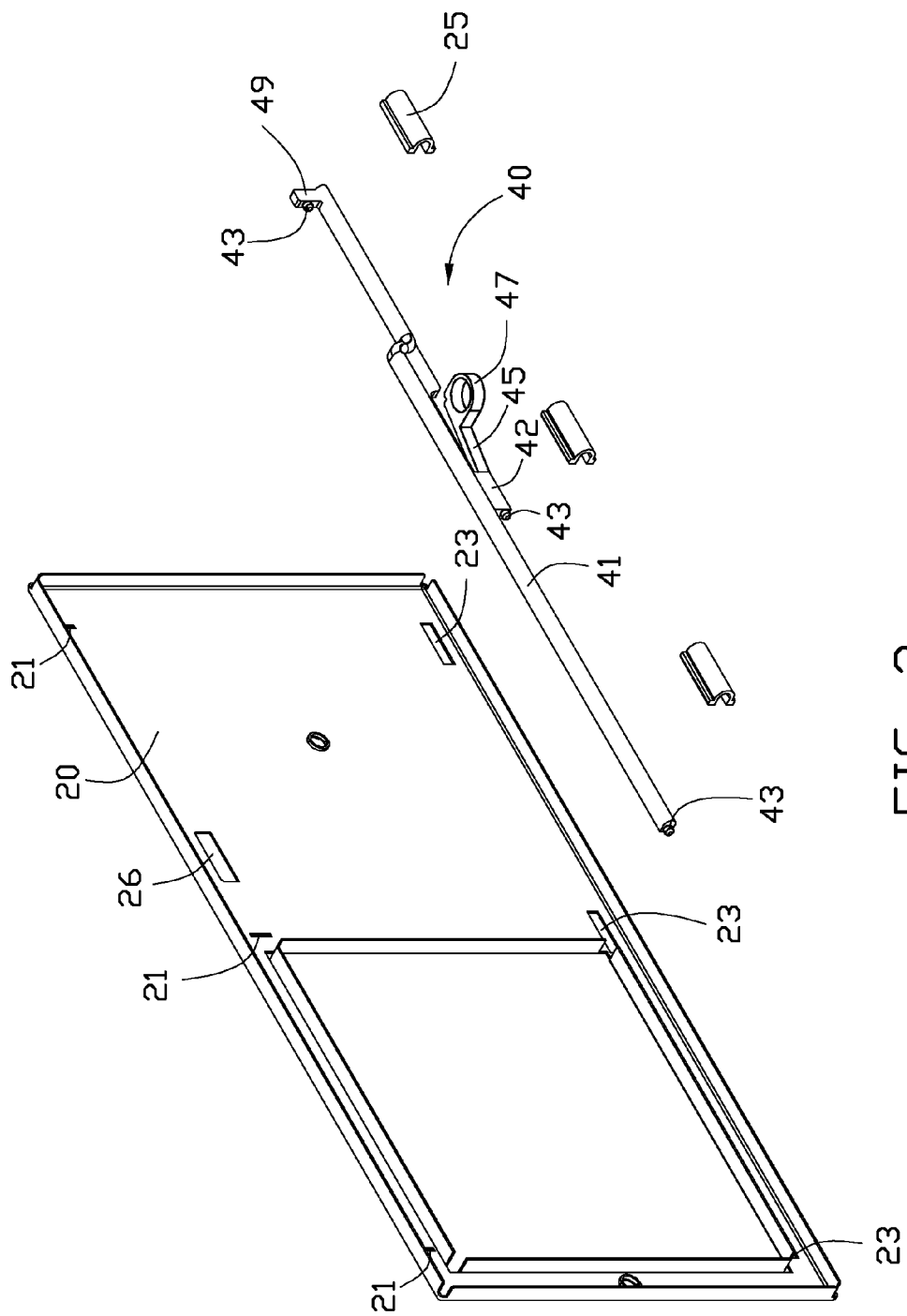
FIG. 2 is an isometric view of the cover and the locking member shown in FIG. 1.

Referring to FIGS. 1 and 2, one embodiment of a case 100 includes a chassis 10, a cover 20, a bezel 30 and a locking member 40. The chassis 10 is a substantially U-shaped frame defining two openings 11 on opposite ends of the chassis 10. The cover 20 is mounted on one of the two openings 11, and cooperatively defines a main body of the case 100. The locking member 40 is slidably located on the cover 20, and clasps the bezel 30 to the cover 20.

The cover 20 defines three mounting holes 21 and three latching holes 23 on opposite ends of the cover 20. The three mounting holes 21 and the three latching holes 23 are aligned in a line, respectively. The cover 20 further includes a plurality of fixing members 25 located adjacent to the mounting holes 21 and a positioning portion 26 located between two adjacent mounting holes 21. Each fixing member 25 is substantially horseshoe-shaped, and fixes the locking member 40 to the cover 20. In the illustrated embodiment, the positioning portion 26 is a through hole defined on the cover 20.

Figure 3:
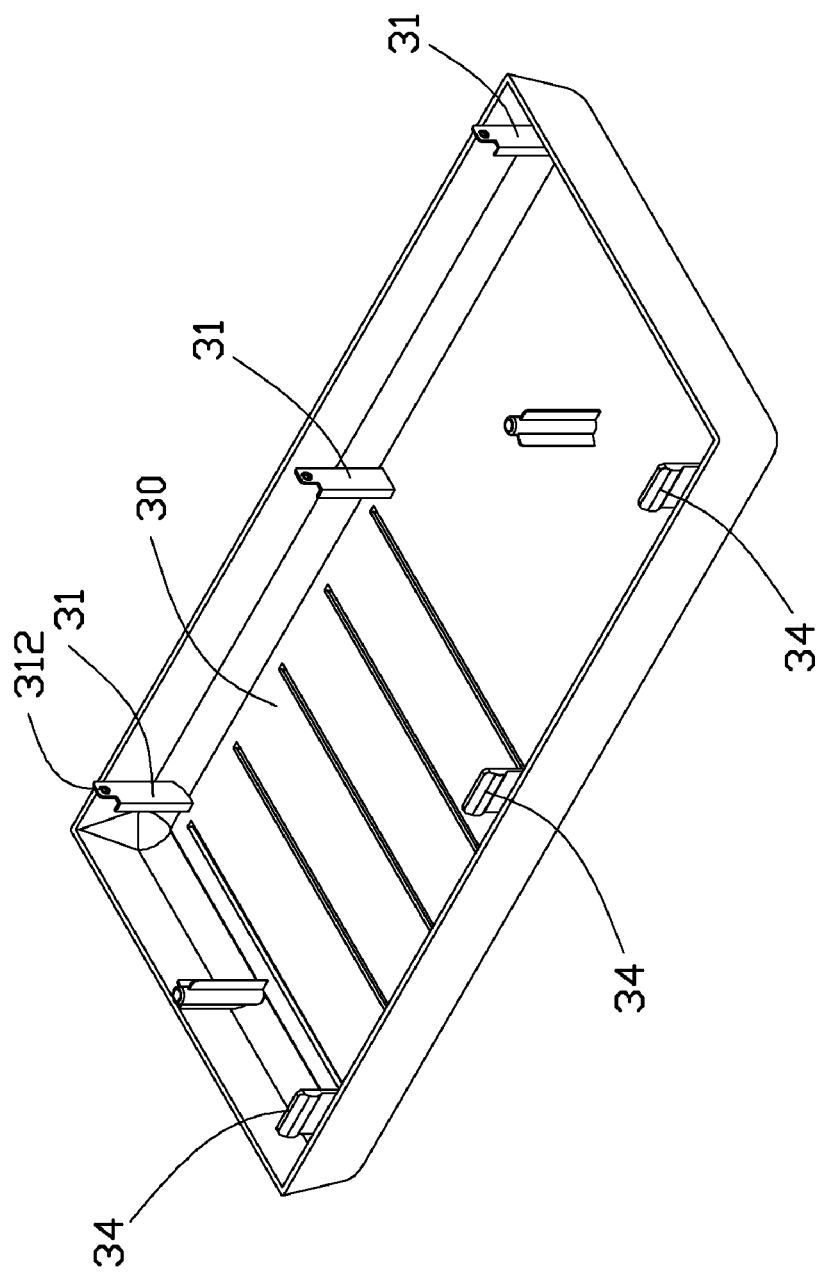
FIG. 3 is an isometric view of the bezel shown in FIG. 1.

Referring to FIG. 3, the bezel 30 includes three engaging portions 31 and three hooks 34, and the three hooks 34 are located on an inner surface of the bezel 30. The three engaging portions 31 and the three hooks 34 are aligned in a line, respectively. Each engaging portion 31 is disposed corresponding to one hook 34. In the illustrated embodiment, each engaging portion 31 is a protrusion extending perpendicular to an inner surface of the bezel 30 and defining a latching hole 312 in a top end of the protrusion, which is the engaging portion 31.

Referring to FIG. 2 again, the locking member 40 includes a rod 41, an extending portion 42 and three latching portions 43, a resilient portion 45, a handle 47 and a bending portion 49. The extending portion 42 is a protrusion extending from a middle portion of the rod 41. One of the latching portions 43 and the resilient portion 45 are located on opposite ends of the extending portion 42. The other two latching portions 43 are respectively arranged at each end of the bar 41, and an end of the bending portion 49 is adjacent to the handle 47. The handle 47 is located on a free end of the resilient portion 45. In the illustrated embodiment, the handle 47 is a ring mounted on a free end of the resilient portion 45. The bending portion 49 is arranged at a sidewall at an end of the rod 41. The resilient portion 45 contacts and resists the positioning portion 26, such that the locking member 40 can not slide relative to the cover 20. The free end of the resilient portion 45 is elastically flexed by drawing on the handle 47, such that the resilient portion 45 is detached from the positioning portion 26, and the locking member 40 then can slide relative to the cover 20. In the illustrated embodiment, each latching portion 43 is a latching protrusion received in the latching hole 312.

Figure 4:
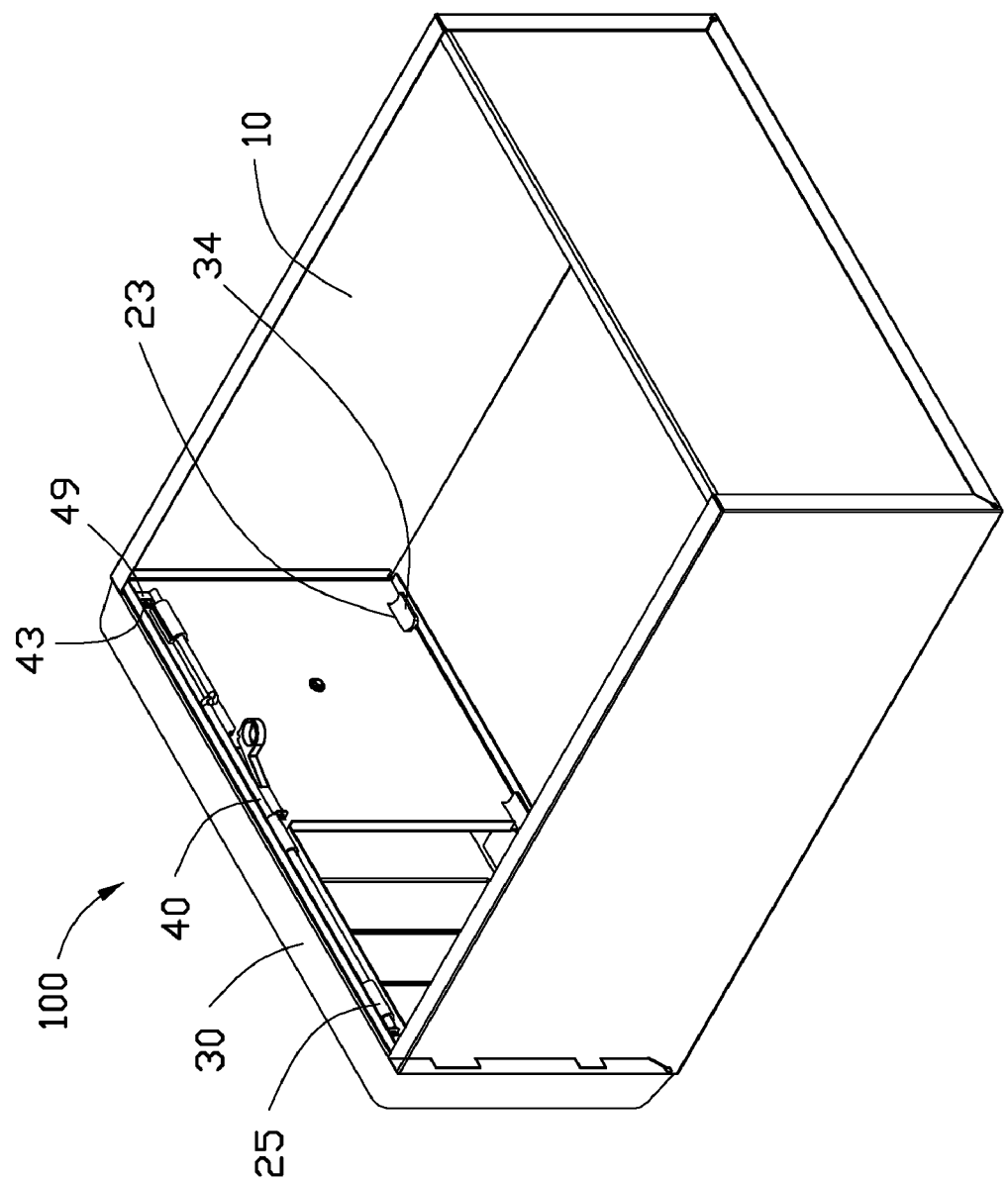
FIG. 4 is an assembled, isometric view of the case shown in FIG. 1.
Figure 5:
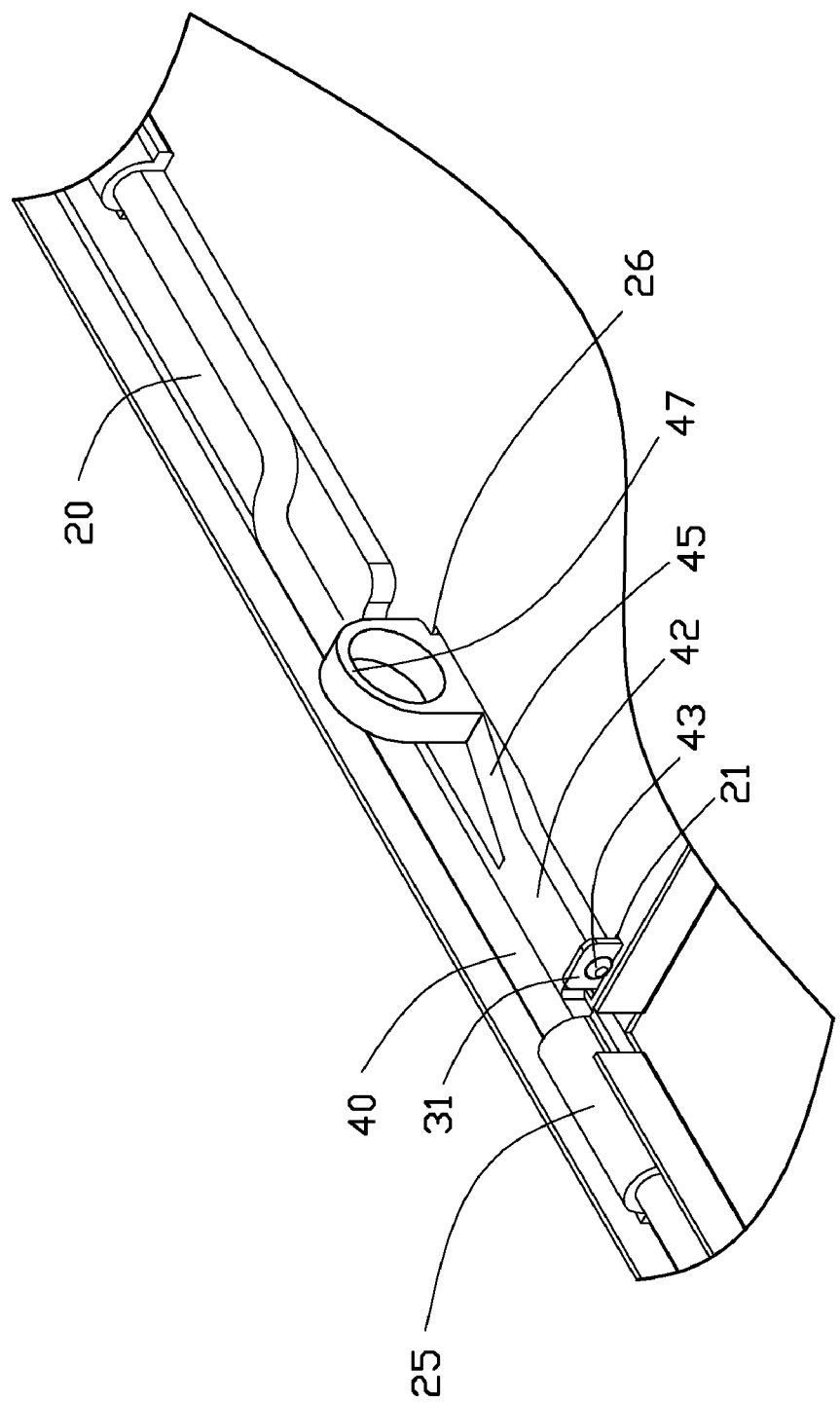
FIG. 5 is an enlarged, partial, isometric view of the bezel mounted on the cover shown in FIG. 4 in a clasped position.

Referring to FIGS. 4 and 5, during assembly of the bezel 30, the hooks 34 of the bezel 30 are received in the latching holes 23 of the cover 20. The engaging portions 31 of the bezel 30 pass through the mounting holes 21 of the cover 20. The fixing members 25 of the cover 20 are sleeved over the locking member 40. The locking member 40 slides relative to the cover 20 until the latching portions 43 are received in the latching holes 312 of the engaging portions 31. Thereby, the bezel 30 is clasped onto the cover 20.

Figure 6:
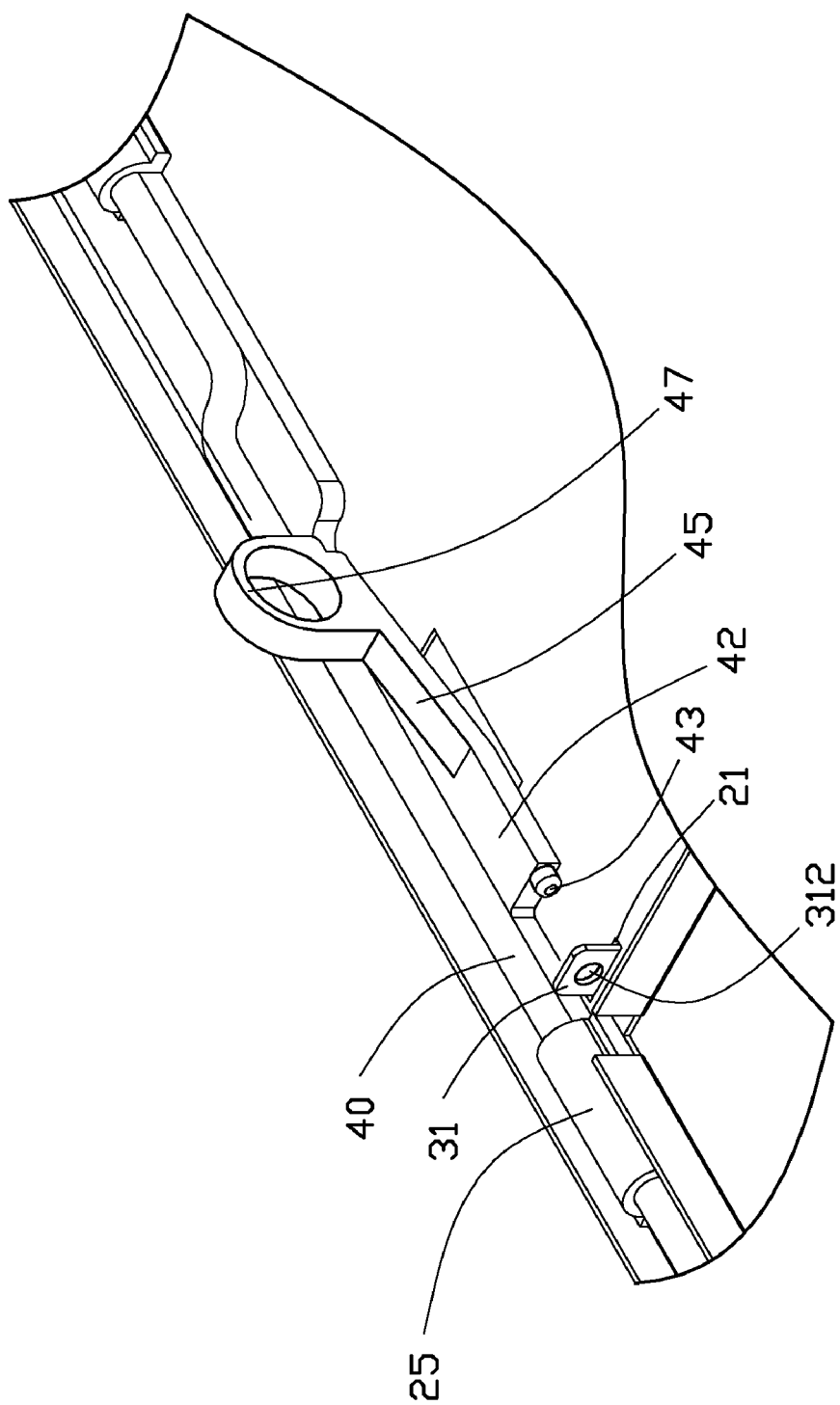
FIG. 6 is an enlarged, partial, isometric view of the bezel mounted on the cover shown in FIG. 4 in an unclasped position.

Referring to FIGS. 4 and 6, during disassembly of the bezel 30, a free end of the resilient portion 45 is elastically flexed by drawing the handle 47, such that the resilient portion 45 detaches from the positioning portion 26. The locking member 40 slides relative to the cover 20 until the latching portion 43 is apart from the engaging portion 31 of the bezel 30. The hooks 34 of the bezel 30 are detached from the latching holes 23 of the cover 20. Finally, the bezel 30 is unclasped from the cover 20.

The bezel 30 can be conveniently assembled to or disassembled from the cover 20 by the locking member 40. Furthermore, the hooks 34 are received in the latching holes 23 of the cover 20, such that the bezel 30 is firmly latched on the cover 20.

It is to be understood that the hooks 34 and the latching holes 23 can also be omitted. The locking member 40 can also be two or more, the number of the engaging portions 31 of the bezel 30 is increased correspondingly. The positioning portion 26 can also be a protrusion arranged at the cover 20. The case 100 can also be applied to other electronic device as well, such as a server. The cover 20 can also be integrated with the chassis 10.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A case comprising:
a cover comprising a positioning portion located in an end of the cover and a plurality of mounting holes defined adjacent to the positioning portion;
a bezel comprising a plurality of engaging portions located on an inner surface of the bezel, the engaging portions passing through the mounting holes; and
a locking member slidably attached to the cover, wherein the locking member comprises a latching portion engaging with one of the engaging portions, an extending portion, and a resilient portion directly resisting against the positioning portion, the latching portion extends from one end of the extending portion, the resilient portion extends from the other end of the extending portion, and the resilient portion is detached from the positioning portion by deformation of the resilient portion.

2. The case of claim 1, wherein the cover further comprises a plurality of the fixing members located adjacent to the mounting holes and fixing the locking member to the cover.

3. The case of claim 1, wherein the positioning portion is a through hole defined in the cover.

4. The case of claim 1, wherein the bezel further comprise a plurality of hooks located on inner surface of the bezel, and the cover defines a plurality of latching holes to receive the hooks.

5. The case of claim 1, wherein the locking member further comprises a rod, the extending portion arranged at a middle portion of the rod.

6. The case of claim 5, wherein the extending portion is a protrusion extending from a middle portion of the rod.

7. The case of claim 5, wherein the locking member further comprises a bending portion arranged at a sidewall at an end of the rod, and one of the latching portions is located on an end of the bending portion.

8. The case of claim 5, wherein the locking member further comprises a handle located on a free end of the resilient portion.

9. The case of claim 8, wherein the handle is a ring located on a free end of the resilient portion.

10. The case of claim 1, wherein each engaging portion defines a latching hole in a top end of the corresponding engaging portion.

11. A case comprising:
a main body;
a plurality of mounting holes defined adjacent to a positioning portion;
a bezel comprising a plurality of engaging portions located on an inner surface of the bezel, the engaging portions passing through the mounting holes;
the positioning portion located in a side surface of the main body adjacent to the mounting holes; and
a locking member slidably attached to the main body, wherein the locking member comprises a latching portions engaging with one of the engaging portions, an extending portion, and a resilient portion directly resisting the positioning portion, the latching portion extends from one end of the extending portion, the resilient portion extends from the other end of the extending portion.

12. The case of claim 11, wherein the main body further comprises a plurality of the fixing members located adjacent to the mounting holes and fixing the locking member to the cover.

13. The case of claim 11, wherein the positioning portion is a through hole defined in the side surface of the main body.

14. The case of claim 11, wherein the bezel further comprise a plurality of hooks located on inner surface of the bezel, and the body defines a plurality of latching holes to receive the hooks.

15. The case of claim 11, wherein the locking member further comprises a rod, the extending portion arranged at a middle portion of the rod.

16. The case of claim 15, wherein the extending portion is a protrusion extending from a middle portion of the rod.

17. The case of claim 15, wherein the locking member further comprises a bending portion arranged at a sidewall at an end of the rod, and one of the latching portions is located on an end of the bending portion.

18. The case of claim 15, wherein the locking member further comprises a handle located on a free end of the resilient portion.

19. The case of claim 18, wherein the handle is a ring located on a free end of the resilient portion.

20. The case of claim 11, wherein each engaging portion defines a latching hole in a top end of the corresponding engaging portion.

* * * * *